J. E. NORGORD.
WRENCH.
APPLICATION FILED JAN. 21, 1919.

1,332,140.

Patented Feb. 24, 1920.

Inventor
J. E. Norgord
By
Attorneys.

UNITED STATES PATENT OFFICE.

JOHN E. NORGORD, OF ROCKDALE, WISCONSIN.

WRENCH.

1,332,140.　　　　Specification of Letters Patent.　　Patented Feb. 24, 1920.

Application filed January 21, 1919. Serial No. 272,304.

*To all whom it may concern:*

Be it known that I, JOHN E. NORGORD, a citizen of the United States, residing at Rockdale, in the county of Dane and State of Wisconsin, have invented new and useful Improvements in Wrenches, of which the following is a specification.

This invention relates to wrenches having a slidable inner jaw which is advanced to grip the work by means of a cam lever, the latter being operated by the same hand that grasps the shank or handle of the wrench.

The invention has for its object to provide a novel and improved wrench of the kind stated, and it consists in a combination and arrangement of parts to be hereinafter described in detail and claimed.

In order that the invention may be better understood, reference is had to the accompanying drawing forming a part of this specification, and in said drawing, Figure 1 is an elevation of the wrench;

Figure 1:
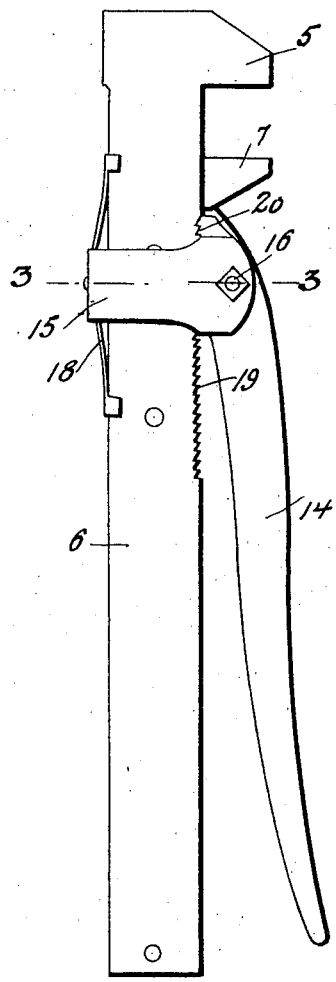
Figure 2:
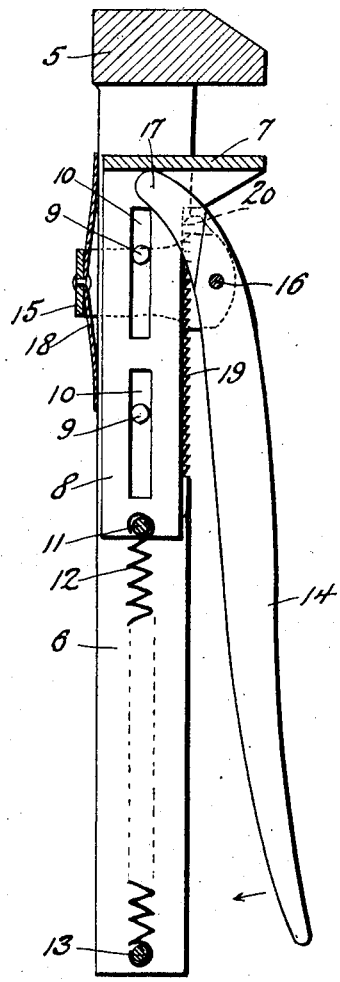
Fig. 2 is a longitudinal section thereof.
Figure 3:
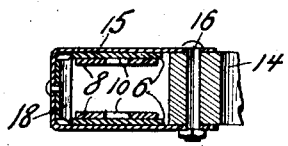
Fig. 3 is a cross section on the line 3—3 of Fig. 1.

Referring specifically to the drawing, 5 denotes the fixed or stationary jaw of the wrench, the same being on the outer end of a shank which is composed of two laterally spaced, parallel bars 6. In the space between the shank bars is slidably mounted the movable jaw 7 of the wrench, the latter being located inwardly of the stationary jaw 5. The jaw 7 is also carried by a shank composed of two laterally spaced, parallel bars 8 which slidably seat on the inner faces of the shank bars 6 and from the latter project lugs 9 which seat in longitudinal slots 10 in the bars 8 and serve to retain and guide the latter bars.

The inner ends of the shank bars 8 carry a cross pin 11 to which is anchored one end of a coiled spring 12 having its other end anchored to a cross pin 13 carried by the outer ends of the shank bars 6. This spring tends to draw the jaw 7 inward, or away from the jaw 5 to release the work.

The jaw 7 is operated to grip the work between the same and the jaw 5, by means of a lever handle 14 fulcrumed to a yoke 15 slidably mounted on the shank bars 6. The yoke straddles these shank bars and its ends project from one side thereof a sufficient distance to take the pivot 16 of the lever handle.

The lever handle 14 has a cam-shaped outer end 17 which seats between the shank bars 8, and by sliding the yoke 15 on the shank bars 6 until the cam reaches the under side of the jaw 7, and then swinging the lever handle 14 inward, the cam advances the jaw 7 to firmly grip the work. The same hand that grasps the shank bars 6 also operates the lever handle, and hence the wrench is easy to operate, and the grip on the work is not relaxed as long as the operator firmly grasps the wrench shank.

The jaw 7 is advanced in the manner described against the tension of the spring 12, and when the lever handle 14 is swung to release the jaw 7, the latter is at once drawn back by the spring to release the work.

The jaw 7 can be quickly set to the work by sliding the yoke 15 forward until the cam 17 engages the jaw 7, and then by pushing on the lever handle 14, without however swinging the same to operate the cam, the jaw can be pushed up close to the work. The lever handle is now operated as hereinafter described to advance the jaw 7 a bit farther to grip the work.

A means is also provided for locking the yoke 15 on the shank bars 6 so that the fulcrum of the lever handle 14 will not shift when in operation. This lock is a flat, bowed spring 18 seating beneath the bight of the yoke and projecting therefrom so that its ends may press on the back edges of the shank bars 6. In the front edges of said bars are racks or ratchet teeth 19 engageable by teeth 20 carried by the yoke branches. The spring 18 tends to force the yoke laterally of the shank bars 6 in a direction to engage the teeth 20 with the ratchet teeth 19, and thus lock the yoke to the shank bars. To release the yoke to permit the same to be slid to set the jaw 7, the yoke must be pressed laterally forward to disengage the interlocking teeth, this being done against the tension of the spring 18, so that when the pressure is released, the spring draws back the yoke and again causes the teeth to interlock. There is sufficient space between the bight of the yoke and the back edge of the shank bars 6 to permit this lateral movement of the yoke, and also to accommodate the spring 18.

I claim:

1. A wrench comprising a longitudinally recessed shank having a fixed jaw, a movable jaw having a longitudinally recessed shank seating slidably in the recess of the first-mentioned shank, coöperating means on the shanks for guiding the second-mentioned shank, a lever handle having a cam end extending into the recess of the second-mentioned shank to engage the movable jaw and advance the same, and a fulcrum support for the lever handle slidably mounted on the first-mentioned shank.

2. A wrench comprising a shank having a fixed jaw, a movable jaw carried by the shank, a lever handle having a cam end engageable with the movable jaw to advance the same, a yoke straddling the shank and movable laterally thereof, the bight of the yoke being opposite and spaced from one edge of the shank, and the branches of the yoke projecting outward of the other edge of the shank, a pivot for the lever handle carried by said projecting portions of the yoke branches, a rack on the last-mentioned edge of the shank, teeth on the yoke engageable with the rack to lock the yoke to the shank, and a spring between the first-mentioned edge of the shank and the bight of the yoke for normally pressing the yoke laterally in a direction to engage the teeth with the rack.

In testimony whereof I affix my signature.

JOHN E. NORGORD.